US010382996B2

(12) United States Patent
Shih et al.

(10) Patent No.: US 10,382,996 B2
(45) Date of Patent: Aug. 13, 2019

(54) MOBILE COMMUNICATION SYSTEMS AND DEVICES, AND METHOD FOR AN EVENT-TRIGGERED MEASUREMENT REPORT

(71) Applicant: Industrial Technology Research Institute, Hsinchu (TW)

(72) Inventors: Ying-Ju Shih, Hsinchu (TW); Yi-Bing Lin, Hsinchu County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 15/857,287

(22) Filed: Dec. 28, 2017

(65) Prior Publication Data

US 2019/0082343 A1   Mar. 14, 2019

Related U.S. Application Data

(60) Provisional application No. 62/557,498, filed on Sep. 12, 2017.

(30) Foreign Application Priority Data

Dec. 7, 2017 (TW) .............................. 106142905 A

(51) Int. Cl.
| H04W 24/10 | (2009.01) |
| H04L 12/24 | (2006.01) |
| H04W 28/02 | (2009.01) |
| H04L 12/26 | (2006.01) |
| H04W 84/12 | (2009.01) |

(52) U.S. Cl.
CPC .......... *H04W 24/10* (2013.01); *H04L 41/0681* (2013.01); *H04L 41/0816* (2013.01);
(Continued)

(58) Field of Classification Search
CPC .......... H04L 2012/5608; H04W 84/12; H04W 88/08; H04W 80/04; H04W 88/06;
(Continued)

(56) References Cited

U.S. PATENT DOCUMENTS 6,445,917 B1   9/2002 Bark et al.
9,526,031 B2   12/2016 Siomina et al.
(Continued)

FOREIGN PATENT DOCUMENTS

| CN | 106899582 A | 6/2017 |
| TW | 201703579 | 1/2017 |
| WO | WO 2016/190902 A1 | 12/2016 |

OTHER PUBLICATIONS

Taiwan Patent Office, Office Action, Patent Application Serial No. 106142905, dated Oct. 3, 2018, Taiwan.
(Continued)

*Primary Examiner* — Brenda H Pham

(57) ABSTRACT

A mobile communication system including a base station, a WLAN AP, and a mobile communication device is provided. The base station transmits a first measurement configuration including a first threshold value and a second threshold value which is less than the first threshold value. The WLAN AP is configured with a serving AP ID and a neighboring AP ID. The mobile communication device connects to the WLAN AP with the serving AP ID, measures a first signal strength of the WLAN AP with the serving AP ID according to the first measurement configuration, measures a second signal strength of the WLAN AP with the neighboring AP ID according to the first measurement configuration, and transmits a first measurement report to the base station when the first signal strength is less than the first threshold value and the second signal strength is greater than the second threshold value.

34 Claims, 7 Drawing Sheets

(52) U.S. Cl.
CPC .......... *H04L 43/065* (2013.01); *H04L 43/16* (2013.01); *H04W 28/0236* (2013.01); *H04W 84/12* (2013.01)

(58) Field of Classification Search
CPC . H04W 84/18; H04W 36/18; H04W 36/0011; H04W 36/14; H04W 36/08; H04W 36/30; H04W 36/24; H04W 74/08
USPC .............. 370/349, 310.2, 328, 338, 331–333
See application file for complete search history.

(56) References Cited

U.S. PATENT DOCUMENTS

| | | | |
|---|---|---|---|
| 2005/0030924 A1* | 2/2005 | Yano | H04W 36/30 370/332 |
| 2016/0080958 A1* | 3/2016 | Rinne | H04W 24/10 370/338 |
| 2016/0338068 A1 | 11/2016 | Cheng et al. | |
| 2017/0026884 A1 | 1/2017 | Singh et al. | |
| 2017/0064768 A1 | 3/2017 | Lee et al. | |

OTHER PUBLICATIONS

K. Hiltunen et al., "Comparison Between the Periodic and Event-triggered Intra-frequency Handover Measurement Reporting in WCDMA", IEEE Wireless Communications and Networking Conference, Sep. 2000, pp. 471-475, IEEE, US.

"Evolved Universal Terrestrial Radio Access (E-UTRA); Radio Resource Control (RRC) protocol specification (Release 13)", 3GPP TS 36.331, V13.1.0, Mar. 2016, pp. 1-551, 3GPP Organizational Partners, France.

"Evolved Universal Terrestrial Radio Access (E-UTRA); Packet Data Convergence Protocol (PDCP) specification (Release 13)", 3GPP TS 36.323, V13.1.0, Mar. 2016, 47 pages, 3GPP Organizational Partners, France.

"Evolved Universal Terrestrial Radio Access (E-UTRA) and Evolved Universal Terrestrial Radio Access Network (E-UTRAN); Overall description; stage 2 (Release 13)", 3GPP TS 36.300, V13.4.0, Jun. 2016, pp. 1-310, 3GPP Organizational Partners, France.

"Evolved Universal Terrestrial Radio Access (E-UTRA) and Wireless LAN (WLAN); Xw applicationprotocol (Release 13)", 3GPP TS 36.463, V13.0.0, Mar. 2016, pp. 1-92, 3GPP Organizational Partners, France.

"Evolved Universal Terrestrial Radio Access (E-UTRA) and Wireless LAN (WLAN); Xw interface user plane protocol (Release 13)", 3GPP TS 36.465, V13.0.0, Mar. 2016, pp. 1-14, 3GPP Organizational Partners, France.

D. Lopez-Perez et al., "Long Term Evolution-Wireless Local Area Network Aggregation Flow Control", IEEE Access, Jan. 2017, pp. 9860-9869, vol. 4, IEEE, US.

P. Nuggehalli, "LTE-WLAN Aggregation," IEEE Wireless Communications, Aug. 2016, pp. 4-6, vol. 23, IEEE, US.

* cited by examiner

MOBILE COMMUNICATION SYSTEMS AND DEVICES, AND METHOD FOR AN EVENT-TRIGGERED MEASUREMENT REPORT

CROSS REFERENCE TO RELATED APPLICATION

This Application claims priority of U.S. Provisional Application No. 62/557,498, filed on Sep. 12, 2017, the entirety of which is incorporated by reference herein. This Application also claims priority of Taiwan Patent Application No. 106142905, filed on Dec. 7, 2017, the entirety of which is incorporated by reference herein.

TECHNICAL FIELD

The application generally relates to traffic aggregation in heterogeneous networks, and particularly to a traffic control technique for aggregating traffic in a telecommunication network and a Wireless Local Area Network (WLAN), by allowing the User Equipment (UE) to report, with effective use of radio resources, the situation where the signal strength or signal quality of the WLAN has become better.

BACKGROUND

With growing demand for ubiquitous computing and networking, various wireless technologies have been developed, such as the Wireless Local Area Network (WLAN) technology and telecommunication technologies. The WLAN technology is also called the Wireless Fidelity (WiFi) technology. The telecommunication technologies include Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, Time-Division LTE (TD-LTE) technology, and LTE-Advanced (LTE-A) technology, etc.

For convenience and flexibility, most UEs nowadays are equipped with two wireless communication modules for supporting both the WLAN technology and at least one telecommunication technology. In order to improve the transceiving throughput of the UEs and reduce network operation and management costs of cellular operators, the technique called LTE-WLAN aggregation (LWA) is proposed and defined by the 3rd Generation Partnership Project (3GPP). By employing the LWA technique, a UE may be configured by the LTE network to use both the WLAN technology and the LTE technology for simultaneous data transmission/reception, as shown in FIG. 1.

According to release 13 or release 14 of the 3GPP specifications, the LTE network relies on the UE to measure and report the signal strength/quality of the radio environment, so that it can dynamically adjust the configurations for LWA according to the change of signal strength/quality of the radio environment. There are two types of measurement reports defined in the 3GPP specifications, including periodic measurement reports and event-triggered measurement reports. Disadvantageously, the periodic nature of the periodic measurement reports not only makes them difficult to convey real-time changes in the signal strength/quality of the radio environment, but also occupies a certain amount of radio resources, causing negative impacts on the utilization of radio resources.

On the other hand, the event-triggered measurement reports are limited to only specific events defined in the 3GPP specifications. However, none of those events can be used to indicate the situation where the signal strength/quality of the WLAN has become better. As a result, the LTE network is unable to dynamically adjust the configurations for LWA to increase the traffic volume through the WLAN, and the transceiving throughput may not be improved as it could be.

SUMMARY

This application proposes mobile communication systems and devices, and methods for an event-triggered measurement report, which allow the UEs to promptly report the situation where the signal strength/quality of the WLAN has become better, thereby enabling the telecommunication network to dynamically adjust the configurations for LWA to enhance the transceiving throughput.

In a first aspect of the application, a mobile communication system comprising a base station, a WLAN Access Point (AP), and a mobile communication device is provided. The base station is configured to transmit a first measurement configuration comprising a first threshold value and a second threshold value which is less than the first threshold value. The WLAN AP is configured with a serving AP Identifier (ID) and a neighboring AP ID. The mobile communication device is configured to: connect to the WLAN AP with the serving AP ID, measure a first signal strength of the WLAN AP with the serving AP ID according to the first measurement configuration, measure a second signal strength of the WLAN AP with the neighboring AP ID according to the first measurement configuration, and transmit a first measurement report to the base station when the first signal strength is less than the first threshold value and the second signal strength is greater than the second threshold value.

In a second aspect of the application, a method for an event-triggered measurement report, executed by a mobile communication system comprising a base station, a WLAN AP configured with a serving AP ID and a neighboring AP ID, and a mobile communication device connected to the WLAN AP with the serving AP ID, is provided. The method comprises the steps of: transmitting, by the base station, a first measurement configuration comprising a first threshold value and a second threshold value which is less than the first threshold value to the mobile communication device; measuring, by the mobile communication device, a first signal strength of the WLAN AP with the serving AP ID according to the first measurement configuration; measuring, by the mobile communication device, a second signal strength of the WLAN AP with the neighboring AP ID according to the first measurement configuration; and transmitting, by the mobile communication device, a first measurement report to the base station when the first signal strength is less than the first threshold value and the second signal strength is greater than the second threshold value.

In a third aspect of the application, a mobile communication device comprising a first wireless transceiver, a second wireless transceiver, and a controller is provided. The first wireless transceiver is configured to perform wireless transmission and reception to and from a base station. The second wireless transceiver is configured to connect to a WLAN AP with a serving AP ID, wherein the WLAN AP is configured with the serving AP ID and a neighboring AP ID. The controller is configured to: measure a first signal strength of the WLAN AP with the serving AP ID via the second wireless transceiver, measure a second signal strength of the WLAN AP with the neighboring AP ID via the second wireless transceiver, and transmit a first measurement report to the base station via the first wireless transceiver when the first signal strength is less than a first threshold value and the second signal strength is greater than a second threshold value, wherein the second threshold value is less than the first threshold value.

In a fourth aspect of the application, a method for an event-triggered measurement report, executed by a mobile communication device connected to a base station and to a WLAN AP with a serving AP ID, wherein the WLAN AP is configured with the serving AP ID and a neighboring AP ID, is provided. The method comprises the steps of: measuring a first signal strength of the WLAN AP with the serving AP ID; measuring a second signal strength of the WLAN AP with the neighboring AP ID; and transmitting a first measurement report to the base station when the first signal strength is less than a first threshold value and the second signal strength is greater than a second threshold value, wherein the second threshold value is less than the first threshold value.

Other aspects and features of the disclosure will become apparent to those with ordinary skill in the art upon review of the following descriptions of specific embodiments of the mobile communication systems and devices, and methods for an event-triggered measurement report.

BRIEF DESCRIPTION OF DRAWINGS

The disclosure can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
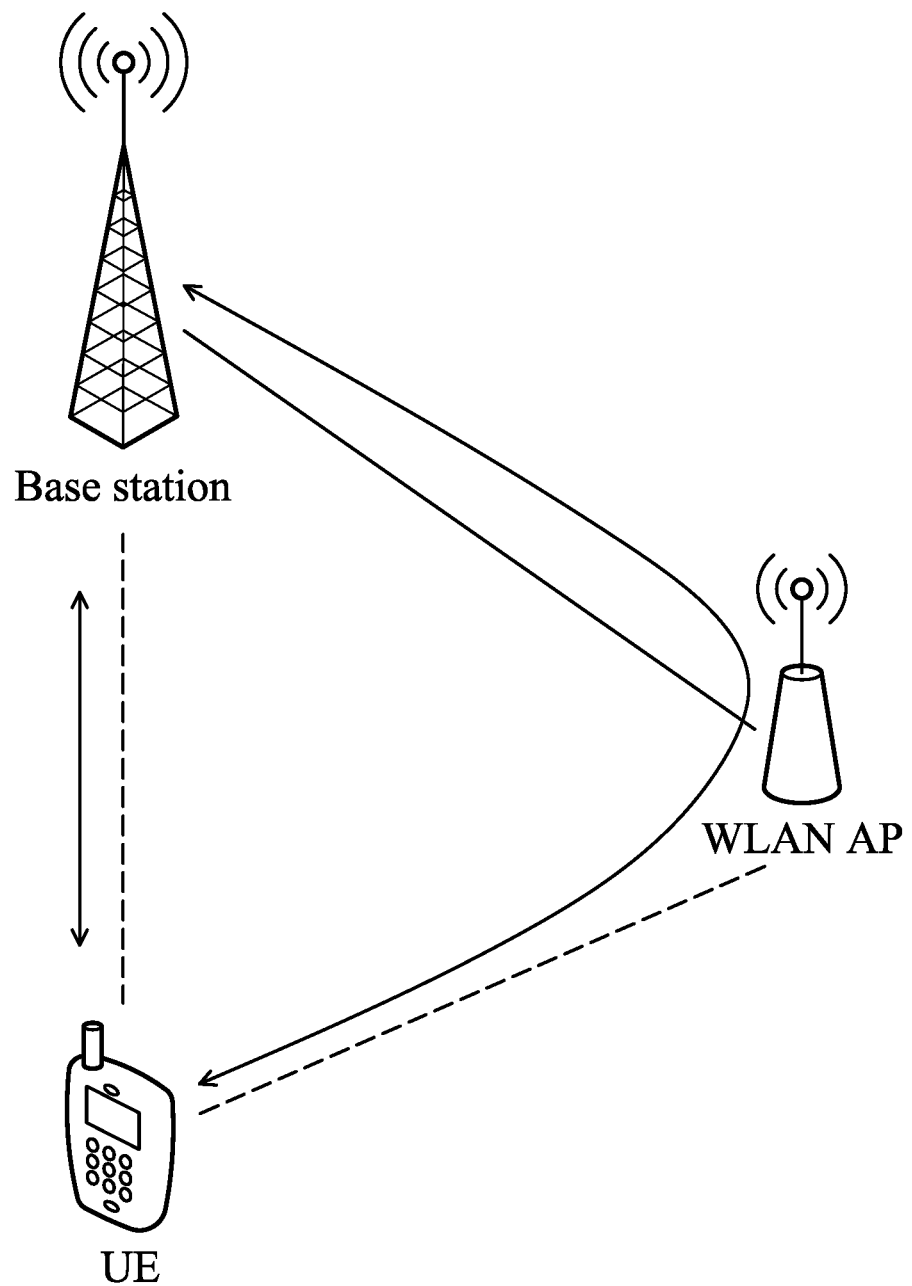
FIG. 1 is a schematic diagram illustrating the LWA technique.
Figure 2:
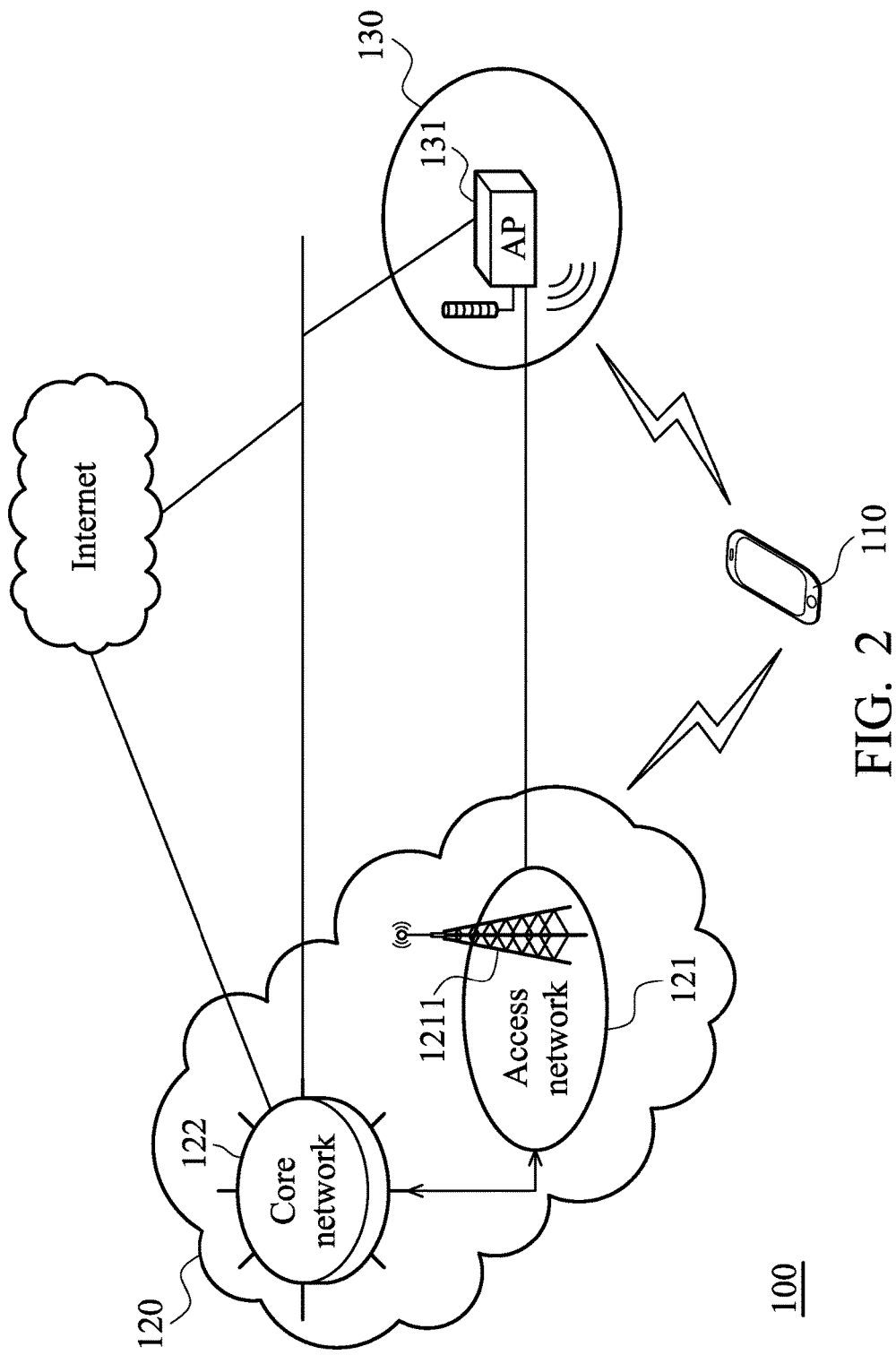
FIG. 2 is a block diagram illustrating a mobile communication system according to an embodiment of the application.

FIG. 2 is a block diagram illustrating a mobile communication system according to an embodiment of the application. The mobile communication system 100 includes a mobile communication device 110, a telecommunication network 120, and a WLAN 130.

The mobile communication device 110 may be a smartphone, panel PC, laptop computer, or any computing device supporting the telecommunication technology utilized by the telecommunication network 120 and the WLAN technology utilized by the WLAN 130. The mobile communication device 110 may also be referred to as a UE or Mobile Station (MS). The mobile communication device 110 may selectively connect to the telecommunication network 120 or the WLAN 130, or may connect to both the telecommunication network 120 and the WLAN 130 for wireless communications using the LWA technique.

The telecommunication network 120 may be an LTE network, a TD-LTE network, or an LTE-A network, depending on the telecommunication technology in use. Specifically, the telecommunication network 120 includes an access network 121 and a core network 122, wherein the access network 121 is responsible for processing radio signals, terminating radio protocols, and connecting the mobile communication device 110 with the core network 122, while the core network 122 is responsible for performing mobility management, network-side authentication, and interfaces with public/external networks (e.g., the Internet).

The access network 121 may be an Evolved Universal Terrestrial Radio Access Network (E-UTRAN) which includes at least a base station 1211, such as an evolved Node-B (eNB). The core network 122 may be an Evolved Packet Core (EPC) which includes a Home Subscriber Server (HSS), Mobility Management Entity (MME), Serving Gateway (S-GW), and Packet Data Network Gateway (PDN-GW or P-GW).

It should be understood that the LTE network, TD-LTE network, or LTE-A network is merely an example of the telecommunication network 120 and is not intended to limit the scope of the application. For example, the telecommunication network 120 may be a network utilizing any future version of the LTE-based technology.

The WLAN 130 may be established by an Access Point (AP) 131 utilizing the WLAN technology. Specifically, the AP 131 may connect to a local area network by an Ethernet cable, and then connect to the Internet via the local area network, and further connect to the core network 122 via the Internet. Alternatively, the AP 131 may directly connect to the access network 121 or the core network 122 via the local area network. For example, if the telecommunication network 120 is an LTE/LTE-A/TD-LTE network, the AP 131 may connect to the base station 1211 of the access network 121 or to the PDN-GW/P-GW of the core network 122, wherein the PDN-GW/P-GW may receive, buffer, and transmit data traffic between the mobile communication device 110 and the WLAN 130.

The AP 131 may be configured with two AP Identifiers (IDs), wherein each AP ID may be a Service Set Identifier (SSID), a Basic Service Set Identifier (BSSID), or a combination of an SSID and a BSSID. Specifically, one of the two AP IDs may be configured as the serving AP ID with which the mobile communication device 110 connects to the AP 131, while the other one of the two AP IDs may be configured as the (makeup) neighboring AP ID which is particularly used for the method for an event-triggered measurement report in the present application (detailed description thereof will be given later in FIGS. 5 and 6A-6B).

Figure 3:
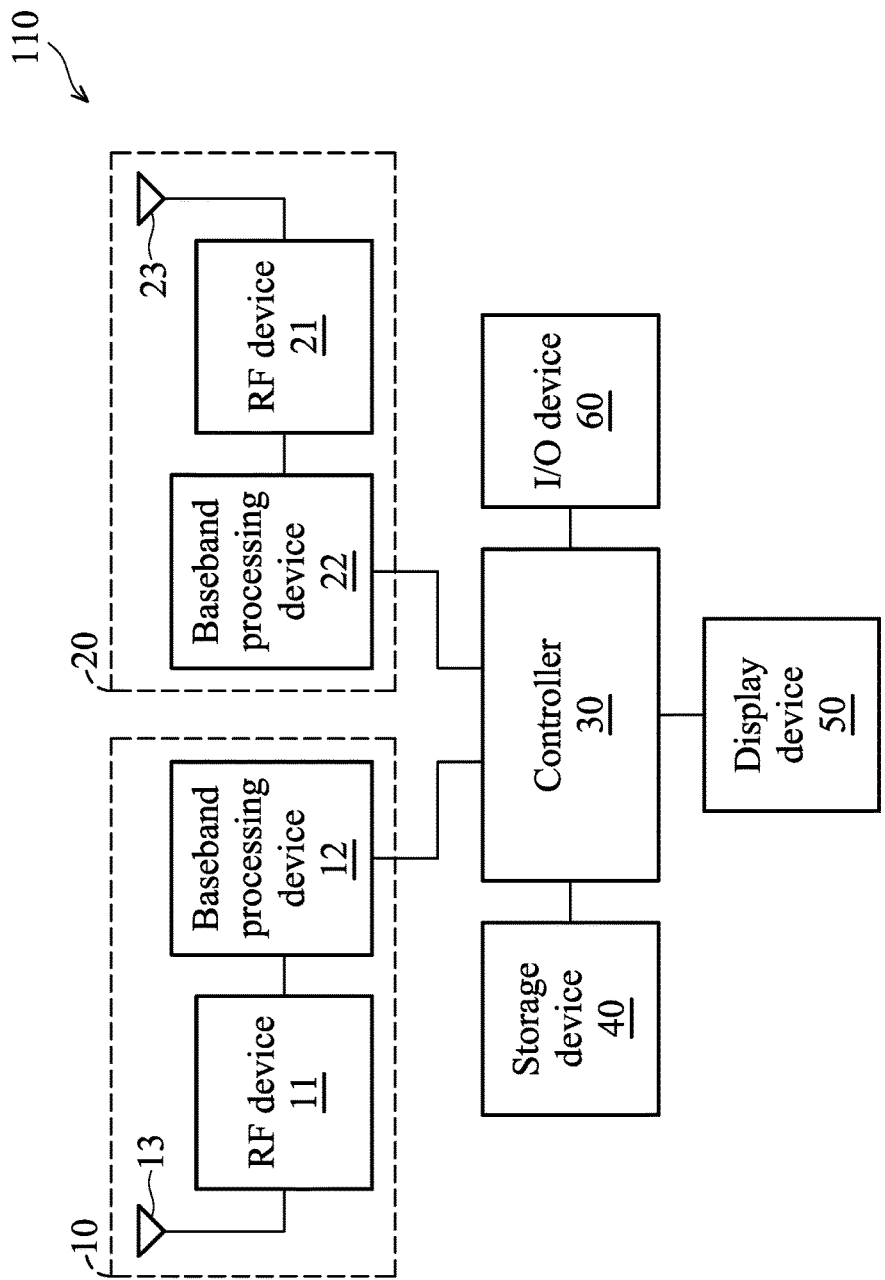
FIG. 3 is a block diagram illustrating the mobile communication device 110 according to an embodiment of the application.

FIG. 3 is a block diagram illustrating the mobile communication device 110 according to an embodiment of the application. The mobile communication device 110 includes two wireless transceivers 10 and 20, a controller 30, a storage device 40, a display device 50, and an Input/Output (I/O) device 60. The wireless transceiver 10 is responsible for providing the function of wireless transmission and reception to and from the telecommunication network 120. Specifically, the wireless transceiver 10 includes a Radio Frequency (RF) device 11, a baseband processing device 12, and an antenna 13. The wireless transceiver 20 is responsible for providing the function of wireless transmission and reception to and from the WLAN 130. Specifically, the wireless transceiver 20 includes an RF device 21, a baseband processing device 22, and an antenna 23.

Each of the baseband processing devices 12 and 22 may contain multiple hardware components to perform the baseband signal processing, including Analog-to-Digital Conversion (ADC)/Digital-to-Analog Conversion (DAC), gain adjusting, modulation/demodulation, encoding/decoding, and so on. The RF devices 11 and 21 may receive RF wireless signals via the antennas 13 and 23, respectively, convert the received RF wireless signals to baseband signals, which are processed by the baseband processing devices 12 and 22, respectively; or may receive baseband signals from the baseband processing devices 12 and 22, respectively, and convert the received baseband signals to RF wireless signals, which are later transmitted via the antennas 13 and 23, respectively. Each of the RF devices 11 and 21 may also contain multiple hardware devices to perform radio frequency conversion. For example, the RF device 11 or 21 may comprise a mixer to multiply the baseband signals with a carrier oscillated in the radio frequency of the supported wireless technology, wherein the radio frequency may be 2.4 GHz, 3.6 GHz, 4.9 GHz, or 5 GHz utilized in the WLAN technology, or 900 MHz, 2100 MHz, or 2.6 GHz utilized in the LTE/LTE-A/TD-LTE technology, or another radio frequency, depending on the wireless technology in use.

The controller 30 may be a general-purpose processor, a Micro Control Unit (MCU), an application processor, a Digital Signal Processor (DSP), or the like, which includes various circuits for providing the functions of data processing and computing, controlling the wireless transceivers 10 and 20 for communications with the telecommunication network 120 and the WLAN 130, storing and retrieving data to and from the storage device 40, sending frame data (e.g., texts, graphics, or images, etc.) to the display device 50, and receiving user inputs from the I/O device 60. In particular, the controller 30 coordinates the operations of the wireless transceivers 10 and 20, the storage device 40, the display device 50, and the I/O device 60 for performing the method for an event-triggered measurement report in the present application.

As will be appreciated by persons skilled in the art, the circuits in the controller 30 will typically comprise transistors that are configured in such a way as to control the operation of the circuitry in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 40 is a non-transitory computer-readable storage medium, such as a memory (e.g., Random Access Memory (RAM), FLASH memory, or Non-volatile Random Access Memory (NVRAM)), a magnetic storage device (e.g., hard disk or magnetic tape), an optical disc (e.g., Compact Disc Read-Only Memory, CD-ROM), or any combination thereof, for storing instructions or program code of applications, communication protocols, and/or the method for an event-triggered measurement report in the present application.

The display device 50 may be a Liquid-Crystal Display (LCD), Light-Emitting Diode (LED) display, or Electronic Paper Display (EPD), etc., for providing a display function. Alternatively, the display device 50 may further include one or more touch sensors disposed thereon or thereunder for sensing touches, contacts, or approximations of objects, such as fingers or styluses.

The I/O device 60 may include one or more buttons, a keyboard, a mouse, a touch pad, a video camera, a microphone, and/or a speaker, etc., to serve as the Man-Machine Interface (MMI) for interaction with users (e.g., receiving user inputs).

It should be understood that the components described in the embodiment of FIG. 3 are for illustrative purposes only and are not intended to limit the scope of the application. For example, the mobile communication device 110 may include more components, such as a power supply (e.g., a mobile/replaceable battery), and/or a Global Positioning System (GPS), etc., wherein the power supply may provide power to support the operations of the wireless transceivers 10 and 20, the controller 30, the storage device 40, the display device 50, and the I/O device 60, and the GPS device may provide location information of the mobile communication device 110 for use of location-based services or applications.

Figure 4:
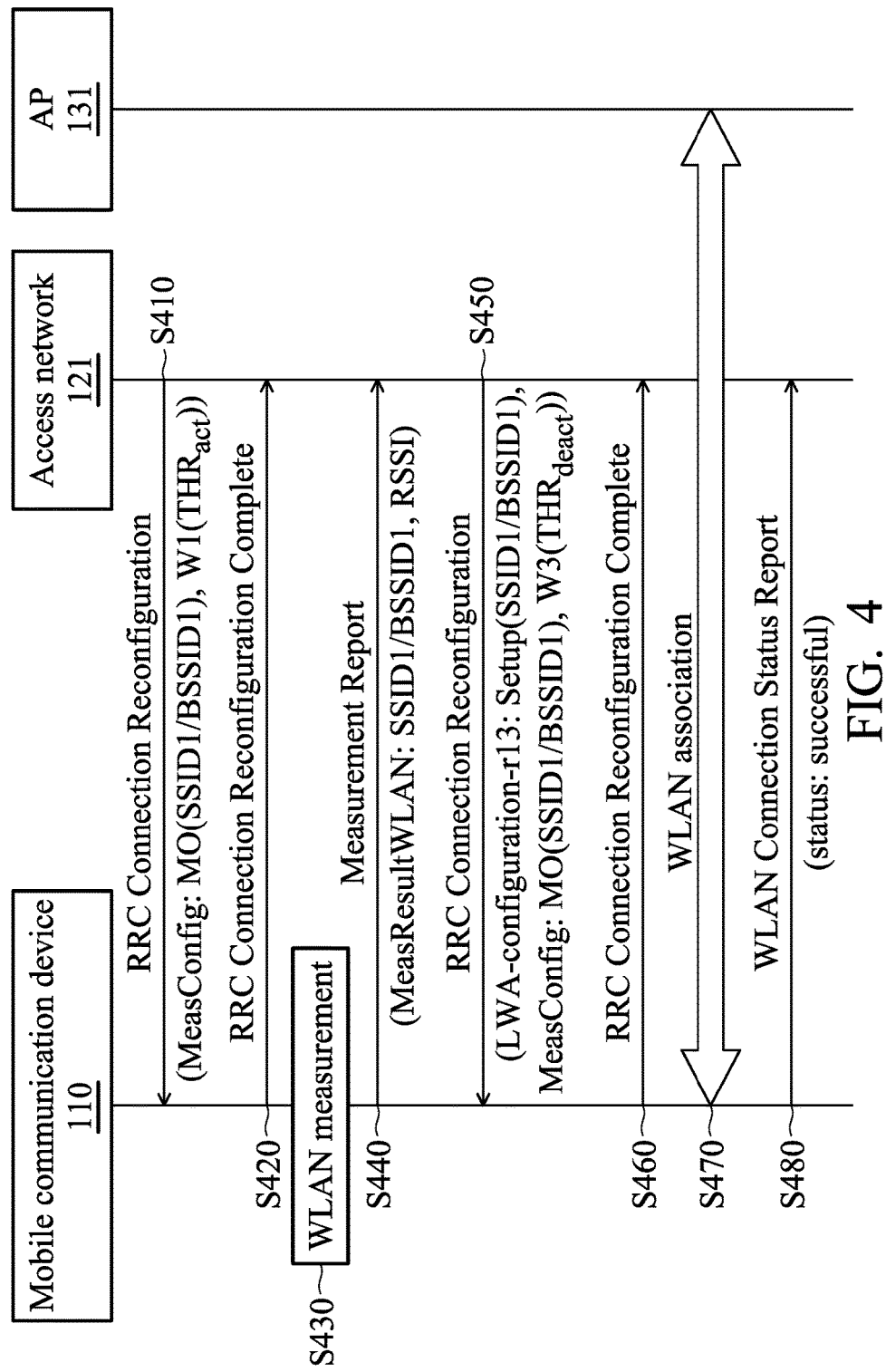
FIG. 4 is a message sequence chart illustrating the LWA activation according to an embodiment of the application.

FIG. 4 is a message sequence chart illustrating the LWA activation according to an embodiment of the application. In this embodiment, the telecommunication network 120 is described as an LTE network for illustrative purposes only and the present application should not be limited thereto.

To begin, the access network 121 transmits an RRC (short for "Radio Resource Control") Connection Reconfiguration message including a measurement configuration to the mobile communication device 110, after the mobile communication device 110 connects to the telecommunication network 120 (step S410). Specifically, the measurement configuration may include configurations related to the WLAN(s) that the mobile communication device 110 needs to measure. For example, the measurement configuration includes the AP ID(s) of the WLAN(s) (which may be stored in the Measurement Object (MO) Information Element (IE)), the type of measurement report (which may be stored in the Reporting Configuration (RC) IE), the event type(s) and corresponding threshold value(s) for event-triggered measurement report (which may be stored in the RC IE), and the linking relationships between the MO(s) and the RC(s) (which may be stored in the Measurement Identity (MI) IE).

The type of measurement report may be periodic measurement report or event-triggered measurement report. The event types for event-triggered measurement report may include the event type W1 for LWA activation, the event type W2 for WLAN mobility, and the event type W3 for LWA deactivation, wherein the event type W1 comes with a threshold value $THR_{act}$, the event type W2 comes with two threshold values $THR_{serv}$ (which is used for the serving AP) and $THR_{neighb}$ (which is used for the neighboring AP), and the event type W3 comes with a threshold value $THR_{deact}$.

To further clarify, in this embodiment, due to that the LWA technique is not yet activated when step S410 is performed, the measurement configuration described in step S410 may include the serving AP ID (i.e., SSID1/BSSID1) of the AP 131, the event type W1, and the threshold value $THR_{act}$.

Subsequent to step S410, the mobile communication device 110 transmits an RRC Connection Reconfiguration Complete message to the access network 121 (step S420), to acknowledge the reception of the RRC Connection Reconfiguration message and the measurement configuration therein.

Subsequent to step S420, the mobile communication device 110 measures the channel or signal strength/quality of the WLAN indicated by the measurement configuration (step S430). Specifically, the mobile communication device 110 may measure and receive the beacon broadcasted by the AP, and obtain the channel or signal strength/quality from the beacon. For example, the channel or signal strength/quality may be indicated using the Received Signal Strength Indicator (RSSI), the Signal-to-Noise Ratio (SNR), the channel utilization, or the station count (i.e., the number of UEs connected to the AP).

Subsequent to step S430, the mobile communication device 110 transmits a Measurement Report message to the access network 121 when the measured channel or signal strength/quality is greater than the threshold value $THR_{act}$ (step S440). Specifically, the Measurement Report message includes the measurement result including the AP ID of the WLAN, and the channel or signal strength/quality of the WLAN.

Subsequent to step S440, the access network 121 transmits an RRC Connection Reconfiguration message including the LWA activation configuration to the mobile communication device 110 (step S450). Specifically, the LWA activation configuration includes the AP ID of the WLAN, and the measurement configurations to be applied after the LWA activation (e.g., the type of measurement report, and the event type(s) and corresponding threshold(s) for event-triggered measurement report, etc.).

For example, the LWA activation configuration described in step S450 may include an indication (e.g., SSID1/BSSID1) for the mobile communication device 110 to connect or associate to the AP 131, and measurement configurations (including SSID1/BSSID1, event type W3, and threshold value $THR_{deact}$).

Subsequent to step S450, the mobile communication device 110 transmits an RRC Connection Reconfiguration Complete message to the access network 121 (step S460), to acknowledge the reception of the RRC Connection Reconfiguration message and the measurement configurations therein.

Subsequent to step S460, the mobile communication device 110 connects or associates to the WLAN (i.e., the AP 131) indicated by the LWA activation configuration (step S470). When the WLAN association is completed successfully, the mobile communication device 110 transmits a WLAN Connection Status Report message to the access network 121 (step S480), to inform the access network 121 that the mobile communication device 110 has connected or associated to the WLAN.

For LWA traffic control, the access network 121 may establish a WLAN threshold table and a LWA traffic control table. In the WLAN threshold table, the value range of the channel or signal strength/quality of the WLAN is partitioned into N levels. The LWA traffic control table is used to record the LWA traffic control parameters for each level defined in the WLAN threshold table.

For example, if the RSSI is used to indicate the channel or signal strength/quality of the WLAN, an exemplary WLAN threshold table may be established as shown in table 1.

TABLE 1

| RSSI level | WLAN RSSI range |
|---|---|
| L1 | $THR_{L1} \sim INF_P$ |
| L2 | $THR_{L2} \sim THR_{L1}$ |
| L3 | $THR_{L3} \sim THR_{L2}$ |
| L4 | $THR_{L4} \sim THR_{L3}$ |
| . | . |
| . | . |
| . | . |
| LN | $THR_{LN} \sim THR_{L(N1)}$ |

In table 1, $INF_P$ represents the positive infinity, and $THR_{LN}$ represents the negative infinity or the threshold value $THR_{deact}$ of the event type W3 for the LWA deactivation. The WLAN RSSI range of the i-th level may be specified as follows: $THR_{Li} \sim THR_{L(i-1)}$, when $1 < i \leq N$; $THR_{L1} \sim INF_P$, when i=1. In accordance with the WLAN threshold table as shown in table 1, an exemplary LWA traffic control table may be established as shown in table 2.

TABLE 2

| WLAN RSSI range | LWA traffic control parameters |
|---|---|
| $THR_{L1} \sim INF_P$ | $LWA\_TC_1$ |
| $THR_{L2} \sim THR_{L1}$ | $LWA\_TC_2$ |
| $THR_{L3} \sim THR_{L2}$ | $LWA\_TC_3$ |
| $THR_{L4} \sim THR_{L3}$ | $LWA\_TC_4$ |
| . | . |
| . | . |
| . | . |
| $THR_{LN} \sim THR_{L(N1)}$ | $LWA\_TC_N$ |

In table 2, $LWA\_TC_i$ represents the LWA traffic control parameters for the i-th RSSI level.

In one embodiment, the LWA traffic control parameters may be used to indicate the WLAN maximum throughput, as shown in Table 3 (assuming that N=4).

TABLE 3

| WLAN RSSI range (dBm) | WLAN max throughput (Mbits/s) |
|---|---|
| $-30 \sim +\infty$ | 300 |
| $-40 \sim -30$ | 200 |
| $-60 \sim -50$ | 100 |
| $-\infty \sim -60$ | 20 |

In another embodiment, the LWA traffic control parameters may be used to indicate the LTE-to-WLAN-Ratio (LWR), as shown in Table 4 (assuming that N=6).

TABLE 4

| WLAN RSSI range (dBm) | LWR |
|---|---|
| $-50 \sim +\infty$ | 1:3 |
| $-55 \sim -50$ | 2:5 |
| $-60 \sim -55$ | 4:7 |
| $-65 \sim -60$ | 2:3 |

TABLE 4-continued

| WLAN RSSI range (dBm) | LWR |
|---|---|
| −70~−65 | 3:4 |
| −75~−70 | 8:9 |

In table 4, −75 dBm is the threshold value $THR_{deact}$ of the event type W3 for the LWA deactivation. Please note that the LWR is specified by using the LTE maximum throughput as the base. For example, if the WLAN RSSI falls within the first RSSI level, then the WLAN throughput may be determined to be 312 Mbit/s with the LTE maximum throughput being 104 Mbit/s.

Figure 5:
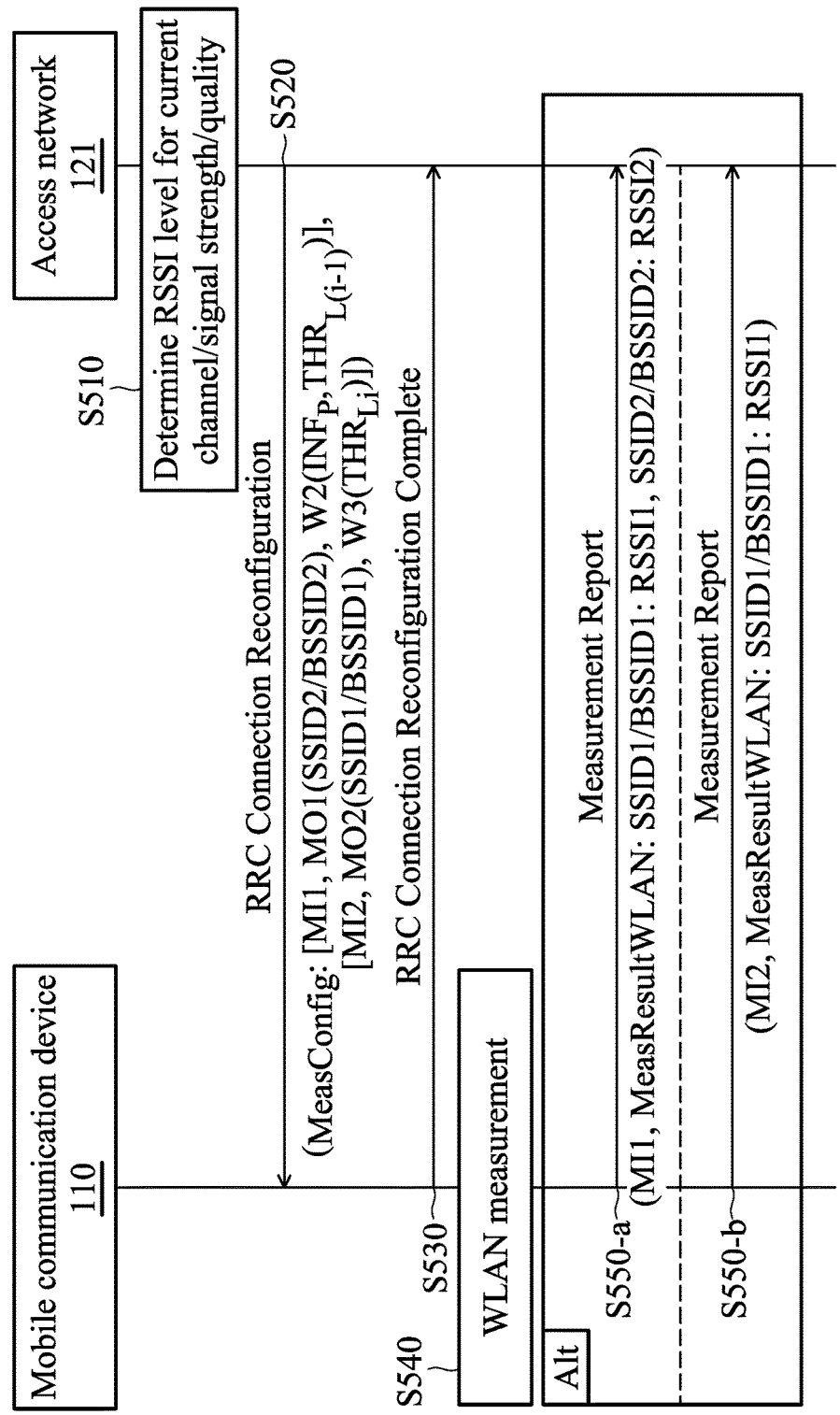
FIG. 5 is a message sequence chart illustrating the method for an event-triggered measurement report according to an embodiment of the application.

FIG. 5 is a message sequence chart illustrating the method for an event-triggered measurement report according to an embodiment of the application. In this embodiment, the LWA technique has been activated (i.e., the mobile communication device 110 is connected to both the telecommunication network 120 and the AP 131 for LWA), and the telecommunication network 120 is configured to send one measurement configuration at a time for only the RSSI level which the current channel or signal strength/quality of the WLAN falls within.

To begin, the access network 121 determines the RSSI level which the channel or signal strength/quality included in the most recently received Measurement Report message (e.g., the Measurement Report message in step S440) falls within, and determines the threshold values of the event types W2 and W3 for this RSSI level (step S510).

Next, the access network 121 transmits an RRC Connection Reconfiguration message including a measurement configuration to the mobile communication device 110 (step S520). Specifically, the measurement configuration includes the AP IDs of the WLANs, the type of measurement report, and the event types and corresponding threshold values for event-triggered measurement report.

For example, if the RRC Connection Reconfiguration message in step S520 is the first RRC Connection Reconfiguration message transmitted after the LWA activation, then the measurement configuration included in the RRC Connection Reconfiguration message in step S520 may include two sets of configurations. Assuming that the channel or signal strength/quality of the WLAN falls within the RSSI level $L_i$, the first set of configurations (determined by using the MI1 IE to link the MO1 IE with the RC IE for event type W2) may include the neighboring AP ID (i.e., SSID2/BSSID2) of the AP 131, the event type W2, and the threshold values $INF_P$ (i.e., the threshold value $THR_{serv}$ for the serving AP) and $THR_{L(i-1)}$ (i.e., the threshold value $THR_{neighb}$ for the makeup neighboring AP (i.e., the serving AP)), while the second set of configurations (determined by using the MI2 IE to link the MO2 IE with the RC IE for event type W3) may include the serving AP ID (i.e., SSID1/BSSID1) of the AP 131, the event type W3, and the threshold value $THR_{Li}$.

In another embodiment, if the channel or signal strength/quality of the WLAN falls within the RSSI level $L_1$, the mobile communication device 110 would only need to detect whether the lower limit of the RSSI level is hit, and the measurement configuration in step S520 may include only one set of configurations, including the serving AP ID (i.e., SSID1/BSSID1) of the AP 131, the event type W3, and the threshold value $THR_{L1}$. In yet another embodiment, if the channel or signal strength/quality of the WLAN falls within the RSSI level $L_N$, the mobile communication device 110 would only need to detect whether the upper limit of the RSSI level is hit, and the measurement configuration in step S520 may include only one set of configurations, including the neighboring AP ID (i.e., SSID2/BSSID2) of the AP 131, the event type W2, and the threshold values $INF_P$ and $THR_{L(N-1)}$.

Subsequent to step S520, the mobile communication device 110 transmits an RRC Connection Reconfiguration Complete message to the access network 121 (step S530), to acknowledge the reception of the RRC Connection Reconfiguration message and the measurement configuration therein.

Subsequent to step S530, the mobile communication device 110 measures the channel or signal strength/quality of the WLAN indicated by the measurement configuration (step S540). Specifically, the mobile communication device 110 may measure and receive the beacon broadcasted by the AP, and obtain the channel or signal strength/quality from the beacon. For example, the channel or signal strength/quality may be indicated using the RSSI, SNR, the channel utilization, or the station count.

Subsequent to step S540, the mobile communication device 110 transmits a Measurement Report message to the access network 121 when the measured channel or signal strength/quality associated with SSID1/BSSID1 is less than the threshold value $INF_P$ of the event type W2 and the measured channel or signal strength/quality associated with SSID2/BSSID2 is greater than the threshold value $THR_{L(i-1)}$ of the event type W2 (step S550-a). For example, the Measurement Report message may include the MI1 IE and the measurement results including the AP IDs of the WLANs (denoted as SSID1/BSSID1 and SSID2/BSSID2 in FIG. 5), and the channel or signal strengths/qualities of the WLANs (denoted as RSSI1 and RSSI2 in FIG. 5).

Alternatively, subsequent to step S540, the mobile communication device 110 transmits a Measurement Report message to the access network 121 when the measured channel or signal strength/quality associated with SSID1/BSSID1 is less than the threshold value $THR_{Li}$ of the event type W3 (step S550-b). For example, the Measurement Report message may include the MI2 IE and the measurement result including the AP ID of the WLAN (denoted as SSID1/BSSID1 in FIG. 5), and the channel or signal strength/quality of the WLAN (denoted as RSSI1 in FIG. 5).

Please note that only one of steps S550-a and S550-b is performed, depending on whether the channel or signal strength/quality of the WLAN satisfies the event type W2 or W3.

Although not shown in FIG. 5, the access network 121 may further adjust the configurations for LWA, subsequent to step S550-a/S550-b. For example, the access network 121 may adjust the traffic volume between the AP 131 and the mobile communication device 110, and/or the traffic volume between the access network 121 and the mobile communication device 110. In a preferred embodiment, if step S550-a is performed, it means that the channel or signal strength/quality of the serving AP (i.e., the AP 131) has become better, and the access network 121 may increase the traffic volume between the AP 131 and the mobile communication device 110. In response to the channel or signal strength/quality of the serving AP becoming better, the level which the channel or signal strength/quality of the serving AP falls within may need to be updated (e.g., from level $L_i$ to $L_{(i-1)}$), and the access network 121 may further determine the threshold values corresponding to the new level and then transmit another RRC Connection Reconfiguration message including the new measurement configuration to the mobile communication device 110. In another embodiment, if step S550-b is performed, the access network 121 may determine whether the channel or signal strength/quality of the serving AP is less than the threshold value $THR_{Li}$, and if so, the level which the channel or signal strength/quality of the serving AP falls within may need to be updated (e.g., from level $L_i$ to $L_{(i+1)}$). In response to the level update, the access network 121 may further determine the threshold values corresponding to the new level and then transmit another RRC Connection Reconfiguration message including the new measurement configuration to the mobile communication device 110.

Figure 6A:
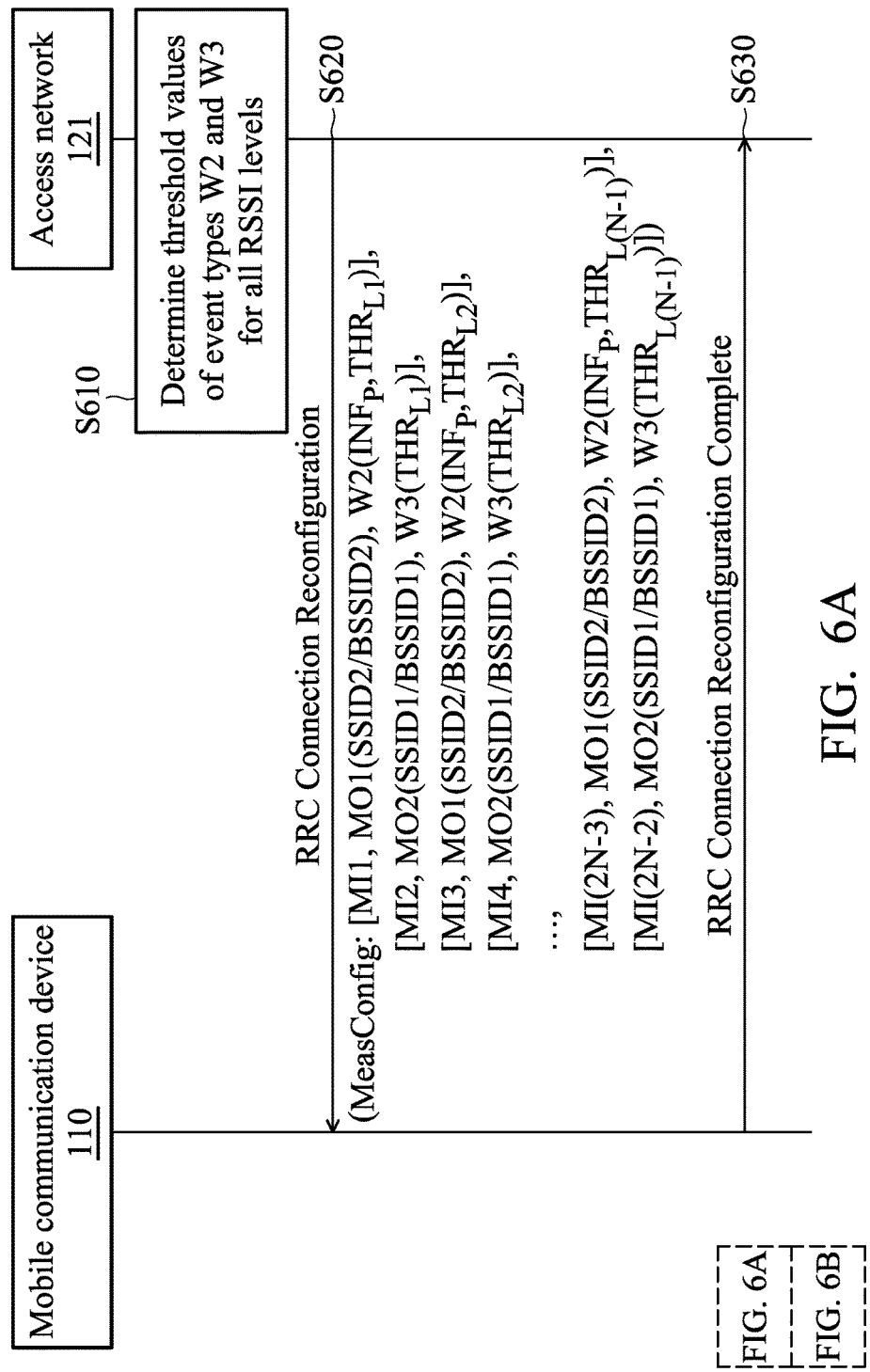
FIGS. 6A and 6B show a message sequence chart illustrating the method for an event-triggered measurement report according to another embodiment of the application.
Figure 6B:
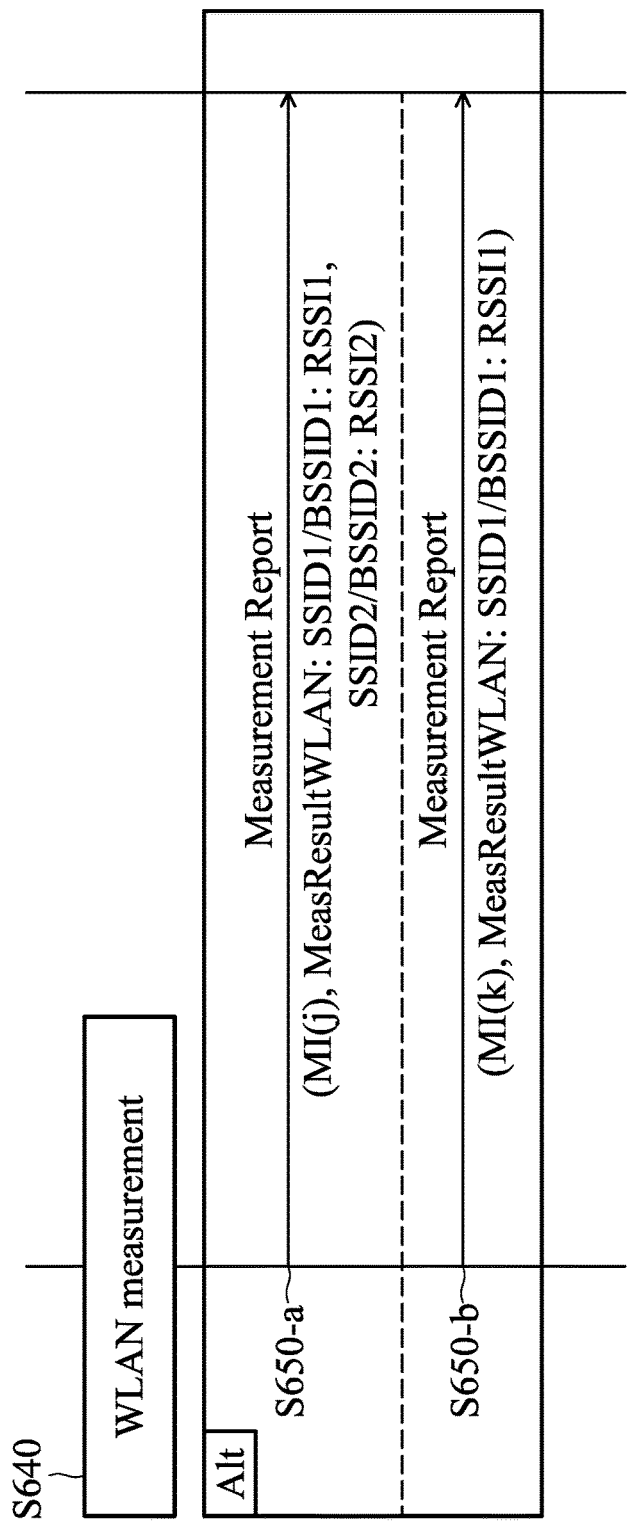

FIGS. 6A and 6B show a message sequence chart illustrating the method for an event-triggered measurement report according to another embodiment of the application. In this embodiment, the LWA technique has been activated (i.e., the mobile communication device 110 is connected to both the telecommunication network 120 and the AP 131 for LWA), and the telecommunication network 120 is configured to send the measurement configurations for all levels of the channel or signal strength/quality of the WLAN to the mobile communication device 110 through a single RRC Connection Reconfiguration message.

To begin, the access network 121 determines the threshold values of the event types W2 and W3 for all levels according to the WLAN threshold table and/or the LWA traffic control table (step S610).

Next, the access network 121 transmits an RRC Connection Reconfiguration message including the measurement configurations to the mobile communication device 110 (step S620). Specifically, the measurement configurations include the AP IDs of the WLANs, the type of measurement report, and the event types and corresponding threshold values for event-triggered measurement report.

For example, the measurement configurations in step S620 may include two sets of configurations for the lower limit of each level $L_i$, where $1 \le i < N$. For the first level ($THR_{L1} \sim INF_P$, wherein $THR_{L1}$ is the lower limit), the first set of configurations (determined by using the MI1 IE to link the MO1 IE with the RC IE for event type W2) may include the neighboring AP ID (i.e., SSID2/BSSID2) of the AP 131, the event type W2, and the threshold values $INF_P$ and $THR_{L1}$, while the second set of configurations (determined by using the MI2 IE to link the MO2 IE with the RC IE for event type W3) may include the serving AP ID (i.e., SSID1/BSSID1) of the AP 131, the event type W3, and the threshold value $THR_{L1}$.

Subsequent to step S620, the mobile communication device 110 transmits an RRC Connection Reconfiguration Complete message to the access network 121 (step S630), to acknowledge the reception of the RRC Connection Reconfiguration message and the measurement configurations therein.

Subsequent to step S630, the mobile communication device 110 measures the signal strength/quality of the WLAN indicated by the measurement configurations (step S640). Specifically, the mobile communication device 110 may measure and receive the beacon broadcasted by the AP, and obtain the channel or signal strength/quality from the beacon. For example, the channel or signal strength/quality may be indicated using the RSSI, SNR, the channel utilization, or the station count.

Subsequent to step S640, the mobile communication device 110 transmits a Measurement Report message to the access network 121 when the measured channel or signal strengths/qualities of the WLANs satisfy the event type W2 of any one of the levels (step S650-a). Taking the first level ($THR_{L1} \sim INF_P$, wherein $THR_{L1}$ is the lower limit) as an example, it may be determined that the measured channel or signal strengths/qualities of the WLANs satisfy the event type W2 of the first level, when the channel or signal strength/quality associated with SSID1/BSSID1 is less than the threshold value $INF_P$ of the event type W2 and the channel or signal strength/quality associated with SSID2/BSSID2 is greater than the threshold value $THR_{L1}$ of the event type W2. The Measurement Report message may include the MI(j) IE (e.g., if the event type W2 of the first level is satisfied, then j=1) and the measurement results including the AP IDs of the WLANs (denoted as SSID1/BSSID1 and SSID2/BSSID2 in FIG. 6B), and the channel or signal strengths/qualities of the WLANs (denoted as RSSI1 and RSSI2 in FIG. 6B).

Alternatively, subsequent to step S640, the mobile communication device 110 transmits a Measurement Report message to the access network 121 when the measured channel or signal strength/quality of the WLAN satisfy the event type W3 of any one of the levels (step S650-b). Taking the first level ($THR_{L1} \sim INF_P$, wherein $THR_{L1}$ is the lower limit) as an example, it may be determined that the measured channel or signal strength/quality of the WLAN satisfy the event type W3 of the first level, when the measured channel or signal strength/quality associated with SSID1/BSSID1 is less than the threshold value $THR_{L1}$ of the event type W3. The Measurement Report message may include the MI(k) IE (e.g., if the event type W3 of the first level is satisfied, then k=2) and the measurement result including the AP ID of the WLAN (denoted as SSID1/BSSID1 in FIG. 6B), and the channel or signal strength/quality of the WLAN (denoted as RSSI1 in FIG. 6B).

Please note that only one of steps S650-a and S650-b is performed, depending on whether the channel or signal strength/quality of the WLAN satisfies the event type W2 or W3 of any one of the levels.

Although not shown in FIG. 6B, the access network 121 may further adjust the configurations for LWA, subsequent to step S650-a/S650-b. For example, the access network 121 may adjust the traffic volume between the AP 131 and the mobile communication device 110, and/or the traffic volume between the access network 121 and the mobile communication device 110. In a preferred embodiment, if step S650-a is performed, it means that the channel or signal strength/quality of the serving AP (i.e., the AP 131) has become better, and the access network 121 may increase the traffic volume between the AP 131 and the mobile communication device 110. In another embodiment, if step S650-b is performed, it means that the channel or signal strength/quality of the serving AP (i.e., the AP 131) has become worse, and the access network 121 may decrease the traffic volume between the AP 131 and the mobile communication device 110.

In view of the foregoing embodiments of FIGS. 5 and 6A-6B, it will be appreciated that the present application realizes event-triggered measurement reports for the situation where the signal strength/quality of the WLAN has become better, by configuring the serving AP with two AP IDs (i.e., both the AP IDs SSID1/BSSID1 and SSID2/BSSID2 are associated with the same AP) to work with the event type W2 measurement reports and configuring the threshold value $THR_{neighb}$ of the event type W2 to be less than the threshold value $THR_{serv}$ of the event type W2. Advantageously, the telecommunication network may be able to dynamically adjust the configurations for LWA to enhance the transceiving throughput.

While the application has been described by way of example and in terms of preferred embodiment, it should be understood that the application cannot be limited thereto. Those who are skilled in this technology can still make various alterations and modifications without departing from the scope and spirit of this application. Therefore, the scope of the present application shall be defined and protected by the following claims and their equivalents.

Note that use of ordinal terms such as "first", "second", "third", "fourth", etc., in the claims to modify a claim element does not by itself connote any priority, precedence, or order of one claim element over another or the temporal order in which acts of the method are performed, but are used merely as labels to distinguish one claim element having a certain name from another element having the same name (except for use of ordinal terms), to distinguish the claim elements.

What is claimed is:

1. A mobile communication system, comprising:
   a base station, configured to transmit a first measurement configuration comprising a first threshold value and a second threshold value which is less than the first threshold value;
   a Wireless Local Area Network (WLAN) Access Point (AP), configured with a serving AP Identifier (ID) and a neighboring AP ID; and
   a mobile communication device, configured to connect to the WLAN AP with the serving AP ID, measure a first signal strength of the WLAN AP with the serving AP ID according to the first measurement configuration, measure a second signal strength of the WLAN AP with the neighboring AP ID according to the first measurement configuration, and transmit a first measurement report to the base station when the first signal strength is less than the first threshold value and the second signal strength is greater than the second threshold value.

2. The mobile communication system of claim 1, wherein the first measurement configuration further comprises a third threshold value and a fourth threshold value which is less than the third threshold value, and the mobile communication device is further configured to transmit the first measurement report to the base station when the first signal strength is less than the third threshold value and the second signal strength is greater than the fourth threshold value.

3. The mobile communication system of claim 1, wherein the base station is further configured to transmit a second measurement configuration comprising a third threshold value and a fourth threshold value which is less than the third threshold value, and the mobile communication device is further configured to measure a third signal strength of the WLAN AP with the serving AP ID according to the second measurement configuration, measure a fourth signal strength of the WLAN AP with the neighboring AP ID according to the second measurement configuration, and transmit a second measurement report to the base station when the third signal strength is less than the third threshold value and the fourth signal strength is greater than the fourth threshold value.

4. The mobile communication system of claim 1, wherein the base station is further configured to adjust a traffic volume between the WLAN AP and the mobile communication device according to the first measurement report.

5. The mobile communication system of claim 3, wherein the base station is further configured to adjust a traffic volume between the WLAN AP and the mobile communication device according to the second measurement report.

6. The mobile communication system of claim 1, wherein the first measurement configuration further comprises a third threshold value, and the mobile communication device is further configured to transmit the first measurement report to the base station when the first signal strength is less than the third threshold value.

7. The mobile communication system of claim 6, wherein the first measurement configuration further comprises a fourth threshold value, and the mobile communication device is further configured to transmit the first measurement report to the base station when the first signal strength is less than the fourth threshold value.

8. The mobile communication system of claim 6, wherein the base station is further configured to transmit a second measurement configuration comprising a fourth threshold value, and the mobile communication device is further configured to measure a third signal strength of the WLAN AP with the serving AP ID according to the second measurement configuration, and transmit a second measurement report to the base station when the third signal strength is less than the fourth threshold value.

9. The mobile communication system of claim 1, wherein each of the serving AP ID and the neighboring AP ID comprises at least one of a Service Set Identifier (SSID) and a Basic Service Set Identifier (BSSID), and each of the first signal strength and the second signal strength is a respective Received Signal Strength Indicator (RSSI).

10. A method for an event-triggered measurement report, executed by a mobile communication system comprising a base station, a WLAN AP configured with a serving AP ID and a neighboring AP ID, and a mobile communication device connected to the WLAN AP with the serving AP ID, the method comprising:
    transmitting, by the base station, a first measurement configuration comprising a first threshold value and a second threshold value which is less than the first threshold value to the mobile communication device;
    measuring, by the mobile communication device, a first signal strength of the WLAN AP with the serving AP ID according to the first measurement configuration;
    measuring, by the mobile communication device, a second signal strength of the WLAN AP with the neighboring AP ID according to the first measurement configuration; and
    transmitting, by the mobile communication device, a first measurement report to the base station when the first signal strength is less than the first threshold value and the second signal strength is greater than the second threshold value.

11. The method of claim 10, wherein the first measurement configuration further comprises a third threshold value and a fourth threshold value which is less than the third threshold value, and the method further comprises:
    transmitting, by the mobile communication device, the first measurement report to the base station when the first signal strength is less than the third threshold value and the second signal strength is greater than the fourth threshold value.

12. The method of claim 10, further comprising:
    transmitting, by the base station, a second measurement configuration comprising a third threshold value and a fourth threshold value which is less than the third threshold value to the mobile communication device;
    measuring, by the mobile communication device, a third signal strength of the WLAN AP with the serving AP ID according to the second measurement configuration;

measuring, by the mobile communication device, a fourth signal strength of the WLAN AP with the neighboring AP ID according to the second measurement configuration; and transmitting, by the mobile communication device, a second measurement report to the base station when the third signal strength is less than the third threshold value and the fourth signal strength is greater than the fourth threshold value.

13. The method of claim 10, further comprising:
adjusting, by the base station, a traffic volume between the WLAN AP and the mobile communication device according to the first measurement report.

14. The method of claim 12, further comprising:
adjusting, by the base station, a traffic volume between the WLAN AP and the mobile communication device according to the second measurement report.

15. The method of claim 10, wherein the first measurement configuration further comprises a third threshold value, and the method further comprises:
transmitting, by the mobile communication device, the first measurement report to the base station when the first signal strength is less than the third threshold value.

16. The method of claim 15, wherein the first measurement configuration further comprises a fourth threshold value, and the method further comprises:
transmitting, by the mobile communication device, the first measurement report to the base station when the first signal strength is less than the fourth threshold value.

17. The method of claim 15, further comprising:
transmitting, by the base station, a second measurement configuration comprising a fourth threshold value;
measuring, by the mobile communication device, a third signal strength of the WLAN AP with the serving AP ID according to the second measurement configuration; and
transmitting, by the mobile communication device, a second measurement report to the base station when the third signal strength is less than the fourth threshold value.

18. The method of claim 10, wherein each of the serving AP ID and the neighboring AP ID comprises at least one of an SSID and a BSSID, and each of the first signal strength and the second signal strength is a respective RSSI.

19. A mobile communication device, comprising:
a first wireless transceiver, configured to perform wireless transmission and reception to and from a base station;
a second wireless transceiver, configured to connect to a WLAN AP with a serving AP ID, wherein the WLAN AP is configured with the serving AP ID and a neighboring AP ID; and
a controller, configured to measure a first signal strength of the WLAN AP with the serving AP ID via the second wireless transceiver, measure a second signal strength of the WLAN AP with the neighboring AP ID via the second wireless transceiver, and transmit a first measurement report to the base station via the first wireless transceiver when the first signal strength is less than a first threshold value and the second signal strength is greater than a second threshold value, wherein the second threshold value is less than the first threshold value.

20. The mobile communication device of claim 19, wherein the controller is further configured to receive a first measurement configuration comprising the first threshold value and the second threshold value from the base station.

21. The mobile communication device of claim 20, wherein the first measurement configuration further comprises a third threshold value and a fourth threshold value which is less than the third threshold value, and the controller is further configured to transmit the first measurement report to the base station via the first wireless transceiver when the first signal strength is less than the third threshold value and the second signal strength is greater than the fourth threshold value.

22. The mobile communication device of claim 19, wherein the controller is further configured to receive a second measurement configuration comprising a third threshold value and a fourth threshold value which is less than the third threshold value from the base station, measure a third signal strength of the WLAN AP with the serving AP ID via the second wireless transceiver, measure a fourth signal strength of the WLAN AP with the neighboring AP ID via the second wireless transceiver, and transmit a second measurement report to the base station via the first wireless transceiver when the third signal strength is less than the third threshold value and the fourth signal strength is greater than the fourth threshold value.

23. The mobile communication device of claim 20, wherein the first measurement configuration further comprises a third threshold value, and the controller is further configured to transmit the first measurement report to the base station via the first wireless transceiver when the first signal strength is less than the third threshold value.

24. The mobile communication device of claim 23, wherein the first measurement configuration further comprises a fourth threshold value, and the controller is further configured to transmit the first measurement report to the base station via the first wireless transceiver when the first signal strength is less than the fourth threshold value.

25. The mobile communication device of claim 23, wherein the controller is further configured to receive a second measurement configuration comprising a fourth threshold value from the base station, measure a third signal strength of the WLAN AP with the serving AP ID via the second wireless transceiver, and transmit a second measurement report to the base station via the first wireless transceiver when the third signal strength is less than the fourth threshold value.

26. The mobile communication device of claim 19, wherein each of the serving AP ID and the neighboring AP ID comprises at least one of an SSID and a BSSID, and each of the first signal strength and the second signal strength is a respective RSSI.

27. A method for an event-triggered measurement report, executed by a mobile communication device connected to a base station and to a WLAN AP with a serving AP ID, wherein the WLAN AP is configured with the serving AP ID and a neighboring AP ID, the method comprising:
measuring a first signal strength of the WLAN AP with the serving AP ID;
measuring a second signal strength of the WLAN AP with the neighboring AP ID; and
transmitting a first measurement report to the base station when the first signal strength is less than a first threshold value and the second signal strength is greater than a second threshold value, wherein the second threshold value is less than the first threshold value.

28. The method of claim 27, further comprising:
  receiving a first measurement configuration comprising the first threshold value and the second threshold value from the base station.

29. The method of claim 28, wherein the first measurement configuration further comprises a third threshold value and a fourth threshold value which is less than the third threshold value, and the method further comprises:
  transmitting the first measurement report to the base station when the first signal strength is less than the third threshold value and the second signal strength is greater than the fourth threshold value.

30. The method of claim 27, further comprising:
  receiving a second measurement configuration comprising a third threshold value and a fourth threshold value which is less than the third threshold value from the base station;
  measuring a third signal strength of the WLAN AP with the serving AP ID;
  measuring a fourth signal strength of the WLAN AP with the neighboring AP ID; and
  transmitting a second measurement report to the base station when the third signal strength is less than the third threshold value and the fourth signal strength is greater than the fourth threshold value.

31. The method of claim 28, wherein the first measurement configuration further comprises a third threshold value, and the method further comprises:
  transmitting the first measurement report to the base station when the first signal strength is less than the third threshold value.

32. The method of claim 31, wherein the first measurement configuration further comprises a fourth threshold value, and the method further comprises:
  transmitting the first measurement report to the base station when the first signal strength is less than the fourth threshold value.

33. The method of claim 31, further comprising:
  receiving a second measurement configuration comprising a fourth threshold value from the base station;
  measuring a third signal strength of the WLAN AP with the serving AP ID; and
  transmitting a second measurement report to the base station when the third signal strength is less than the fourth threshold value.

34. The method of claim 27, wherein each of the serving AP ID and the neighboring AP ID comprises at least one of an SSID and a BSSID, and each of the first signal strength and the second signal strength is a respective RSSI.

* * * * *